Dec. 31, 1946.    R. A. WOLF ET AL    2,413,671
SEAL FOR AIRCRAFT CONTROL RODS
Filed Aug. 13, 1942    2 Sheets-Sheet 1
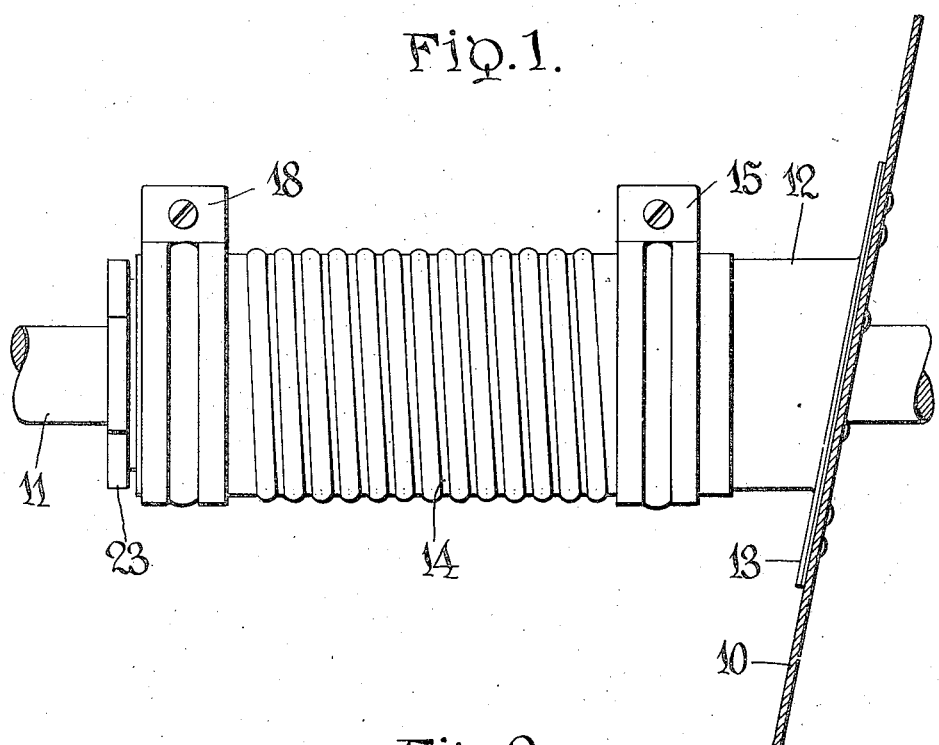
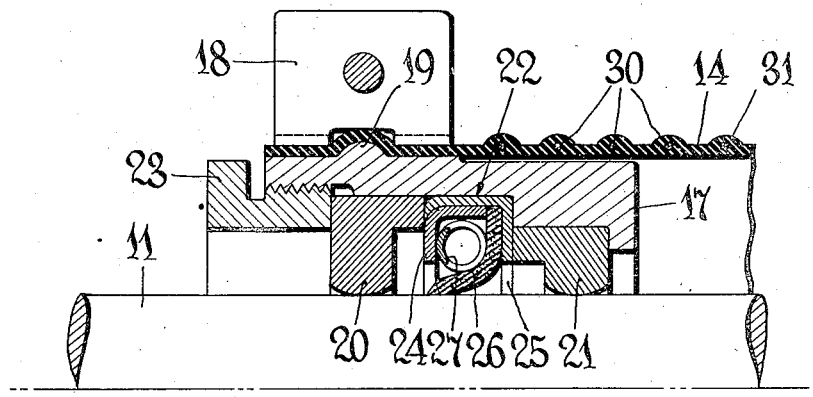
INVENTORS
ROBERT A. WOLF AND
HERBERT L. BOWERS
BY
Bean, Brooks, Buckley & Bean
ATTORNEYS Dec. 31, 1946. R. A. WOLF ET AL 2,413,671
SEAL FOR AIRCRAFT CONTROL RODS
Filed Aug. 13, 1942 2 Sheets-Sheet 2
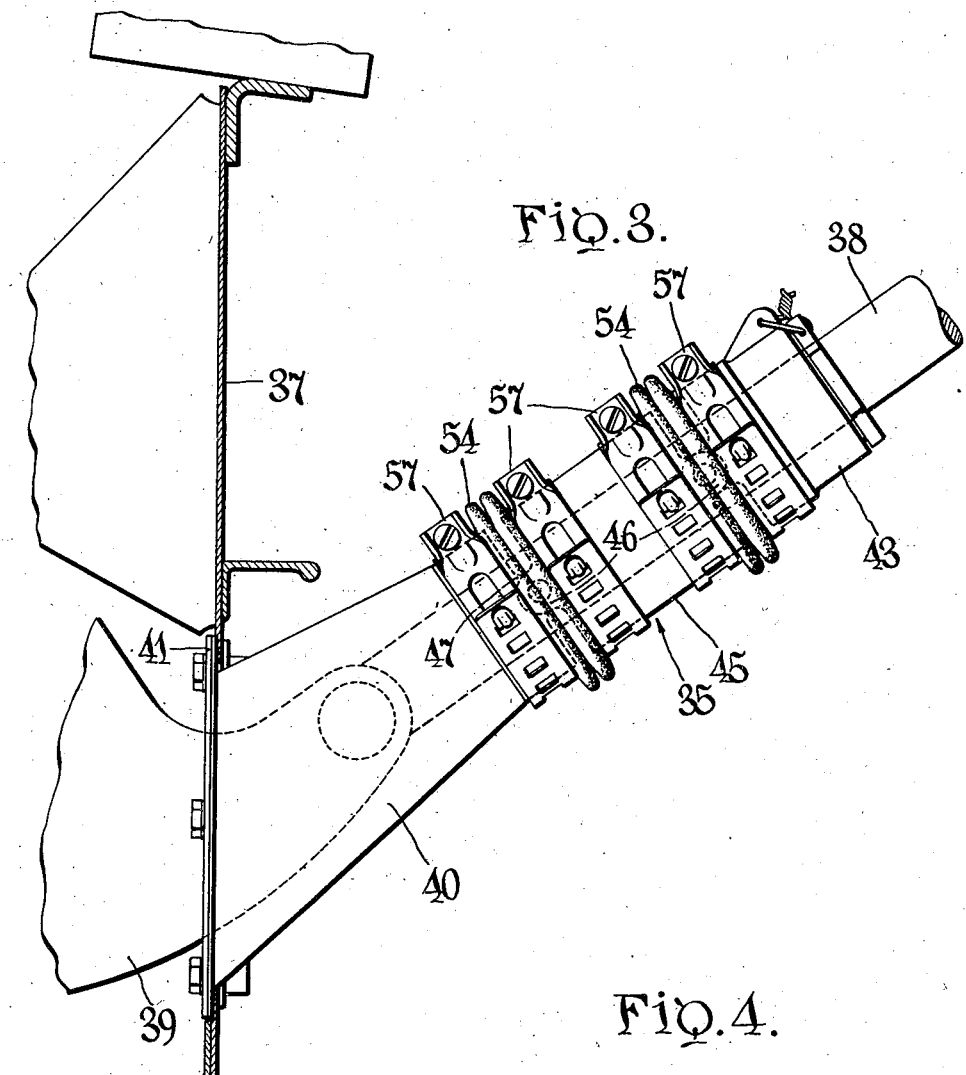
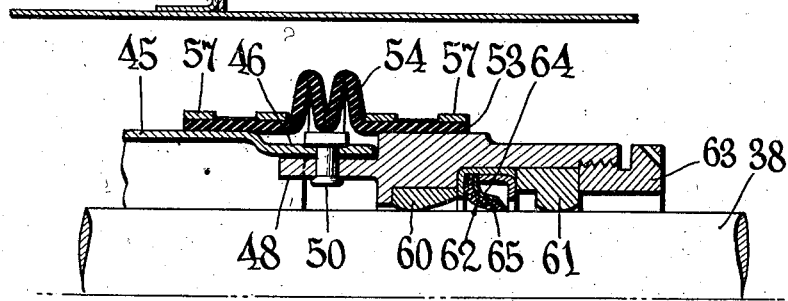
INVENTORS
ROBERT A. WOLF AND
HERBERT L. BOWERS
BY
Bean, Brooks, Buckley & Bean
ATTORNEYS Patented Dec. 31, 1946

2,413,671

UNITED STATES PATENT OFFICE 2,413,671

SEAL FOR AIRCRAFT CONTROL RODS

Robert A. Wolf and Herbert L. Bowers, Kenmore, N. Y., assignors to Bell Aircraft Corporation, Buffalo, N. Y.

Application August 13, 1942, Serial No. 454,630

2 Claims. (Cl. 286—15)

This invention relates to improvements in aircraft body and control structure.

In aircraft construction it is necessary to arrange control means in such fashion that they may be manipulated from within the aircraft to accomplish control functions exteriorly thereof. To this end it is required that certain portions of the control means extend through the aircraft wall structure in such fashion as to be movable with respect to such wall. In aircraft designed to be used at high altitudes, or under any conditions where the atmosphere is sufficiently rarified as to require the maintenance of a pressure higher than that of the surrounding atmosphere within the aircraft body, the problem of extending control means through the wall of the aircraft body is complicated by the necessity for preventing fluid passage thereabout.

The present invention provides an arrangement whereby aircraft control means may be projected through the wall of an aircraft fuselage or other body portion in such fashion as to insure against fluid leak through such wall, while at the same time providing a construction affording the utmost in ease, sensitivity and facility of movement of the control element. It is desired that such control element be movable both axially to and fro in said wall and bodily about axes approximately in the plane of the aircraft wall. It is further desired that the control element be freely rotatable about its own axis.

According to the present invention the sealing element which prevents fluid passage through the aircraft wall at the point of control emergence is so arranged as not to be subject to loads or deflections of any sort, regardless of the kind of movements or forces which may be applied to the control element itself.

Several forms of the improved aircraft control supporting and wall-sealing structure are shown and described in detail herein but it is to be understood that various mechanical modifications are within the province of those skilled in the art and that the invention is not to be considered limited otherwise than as defined in the appended claims.

In the drawings:

Fig. 1 is a fragmentary cross sectional view through an aircraft body wall showing a control element extending therethrough and one form of the improved means for supporting the control element and sealing the aircraft wall;

Fig. 2 is a fragmentary, longitudinal cross sectional view through the left-hand portion of the sealing means of Fig. 1;

Fig. 3 is a cross sectional view through an aircraft wall showing a modified form of sealing means in elevation; and Fig. 4 is a fragmentary, longitudinal cross sectional view through the right-hand end of the sealing means of Fig. 3.

Like characters of reference denote like parts throughout the several figures of the drawings and in Fig. 1 the numeral 10 designates a portion of an aircraft wall and numeral 11 indicates a control element extending therethrough. The opening of the wall 10 through which the control element 11 extends (not shown) is considerably larger than the control element itself.

A collar 12 is disposed against the inner side of the wall 10 and has a base flange 13 which is riveted to the wall or otherwise secured in fluid tight relation. A flexible tube 14 has one of its ends disposed about the outer end of the collar 12 and may be secured in position by a conventional hose clamp 15, or the like.

The opposite end of the tube 14 is disposed about a collar 17 and a second hose clamp 18 is provided for maintaining the proper assembly. If desired, the collars 12 and 17 may be formed with peripheral ridges as at 19, to insure against axial displacement of the parts. The collar 17 has inner annular formations for receiving and seating a pair of spaced annular bearing elements 20 and 21 having clamped therebetween a sealing assembly designated generally 22. The bearings 20 and 21 and the sealing assembly 22 are retained in the collar 17 by a screw-threaded gland 23.

As appears from Fig. 2, the sealing assembly comprises a pair of complementary annular cage elements 24 and 25 which retain a flexible annular ring 26 which may be of a material having the characteristics of leather or rubber. It will be noted that the inner portion of the sealing ring 26 is disposed obliquely against the control element 11 and the desired form of the sealing element 26 is insured by the presence of an encircling coil spring, 27.

It will be noted from the foregoing that the bearing elements 20 and 21 insure permanent and accurate concentricity as between the collar 17 and the control element 11. At no time can manipulative forces applied to the control element 11 deflect or in any other way affect the sealing relationship of the flexible annular element 26.

In the form shown in Figs. 1 and 2, the tube 14 is formed of rubber or the like and has embedded therein a helical coil spring the convolutions of which appear at 30 in Fig. 2. The spring 30 prevents collapse of tube 14 due to fluid pressure forces exerted against the exterior surface thereof. In the form shown in Fig. 2 the tube 14 is of increased thickness at the convolutions of spring 30 as indicated at 31.

In the form of the invention illustrated in Figs. 3 and 4 the control element sealing means is functionally the same as in Figs. 1 and 2, the chief difference being in the structure of the flexible tube, designated generally by the numeral 35 in Fig. 3. In Fig. 3 the numeral 37 designates an aircraft wall portion and numeral 38 designates a control element in the form of a shaft having operative connection with an arm 39 disposed outside the aircraft body.

Here, again, the opening in the wall 37 is not shown but is considerably larger than the control parts which are to extend therethrough. Over such opening at the inner side of the wall 37 there is a collar 40 which is secured to the aircraft wall 37 by means of a base flange 41 which in this instance seats against the outer surface of the wall 37. In Figs. 3 and 4 numeral 43 designates a collar which is the counterpart of the collar 17 of Fig. 2 and which is connected to the collar 40 by a tube section 45 having ears 46 at its opposite ends for pivotal connection with complementary ears 47 and 48 formed on the collars 40 and 43, respectively. Pivot pins 50 provide articulated connection between the collars 40 and 43 and the tube section 45 and the joints therebetween are sealed by flexible sleeves 53, each of which has an intermediate annular accordion-pleated portion 54, to permit free articulation of the joints between the collars 40 and 43 and the tube section 45. The opposite ends of each sleeve 53 are disposed about the collars 40 and 43 and the tube section 45 and may be secured by means of conventional hose clamps 57.

The collar 43 is stepped and formed at its inner periphery to receive a pair of spaced annular bearing elements 60 and 61 having a fluid sealing assembly 62 engaged therebetween. A screw-threaded gland 63 is provided for retaining the bearings 60 and 61 and the sealing assembly 62. The fluid seal of Fig. 4 is the same as that of Fig. 2 save that a resilient ring 64 is provided for giving shape to a flexible sealing ring 65 and for urging it into sealing engagement with the control element 38.

It will be noted that in both forms of the invention the inner portion of the annular sealing rings 26 and 65 are directed obliquely along the control elements 11 and 38, respectively, in a direction toward the interior of the aircraft body. By virtue of this construction, fluid pressure within the aircraft body in excess of those surrounding the aircraft body will urge the inner periphery of the sealing rings into more intimate sealing contact with the surfaces of the associated control elements.

We claim:

1. An aircraft structure comprising an aircraft wall having a control aperture formed therein, an elongated control element disposed within said aperture and adapted to have a limited amount of movement in substantially all directions, said aperture being of a size considerably greater than the size of said element whereby the latter may be free to have unrestricted floating movement within said aperture, an elongated flexible tubular member fixed at one end to said wall in registration with said aperture, said member projecting only forwardly from said aperture and having an inner diameter substantially equal to the diameter of said aperture, sealing means spaced from said wall and carried by the end of said member which is remote from said wall, said means comprising packing means in sealing engagement with said member, and bearing flanges carried by said tubular member independently of said packing means and axially spaced from each other and from said packing means for supporting said element centrally within the remote end of said tubular member and for relatively guiding said element in its reciprocating movement therein.

2. An aircraft structure comprising an aircraft wall having a control aperture formed therein, an elongated control element disposed within said aperture and adapted to have a limited amount of movement in substantially all directions, said aperture being of a size considerably greater than the size of said element whereby the latter may be free to have unrestricted floating movement within said aperture, an elongated flexible tubular member fixed at one end to said wall in registration with said aperture, said member projecting only forwardly from said aperture and having an inner diameter substantially equal to the diameter of said aperture, sealing means spaced from said wall and carried by the end of said member which is remote from said wall, said means comprising a collar secured to and in sealing engagement within said member, packing means carried by said collar, and bearing flanges secured in said collar independently of said packing means and axially spaced from each other and from said packing means for supporting said element centrally within the remote end of said tubular member and for relatively guiding said element in its reciprocating movement therein.

ROBERT A. WOLF.
HERBERT L. BOWERS.